United States Patent [19]
Habets et al.

[11] Patent Number: 5,043,743
[45] Date of Patent: Aug. 27, 1991

[54] METHOD AND APPARATUS FOR THE IMAGE-WISE EXPOSURE OF LIGHT-SENSITIVE MEDIUM BY A PLURALITY OF LIGHT VALVES

[75] Inventors: Antonius H. M. Habets; Josephus W. Rongen, both of Venlo, Netherlands

[73] Assignee: Oce-Nederland B.V., Netherlands

[21] Appl. No.: 472,825

[22] Filed: Jan. 31, 1990

[30] Foreign Application Priority Data

Feb. 1, 1989 [NL] Netherlands ............... 8900238

[51] Int. Cl.⁵ ............... G01D 15/14; G03B 27/72; B41J 2/44; B41J 2/465
[52] U.S. Cl. ............... 346/107 R; 358/298; 358/160
[58] Field of Search ............... 346/107 R, 108, 160, 346/154; 358/298, 300, 302

[56] References Cited

U.S. PATENT DOCUMENTS

| | | | |
|---|---|---|---|
| 4,605,972 | 8/1986 | Hatanaka | 346/160 |
| 4,728,972 | 3/1988 | Stephany | 346/160 |
| 4,766,445 | 8/1988 | Springer | 346/108 |
| 4,783,146 | 11/1988 | Stephany | 346/160 |
| 4,830,468 | 5/1989 | Stephany | 346/160 |

Primary Examiner—Benjamin R. Fuller
Assistant Examiner—Scott A. Rogers
Attorney, Agent, or Firm—Reed, Smith, Shaw & McClay

[57] ABSTRACT

Method of and apparatus for the image-wise exposure of a moving light-sensitive medium by means of a light source and a number of switchable light valves disposed between the medium and the light source, each individual image dot being formed on the light-sensitive medium by actuating sequentially and synchronously with the movement of the light-sensitive medium a number of light valves which extend parallel to the direction of movement of the light-sensitive medium so that each image dot is exposed to light a number of times consecutively so that the speed of image formation increases proportionally to the number of light valves.

7 Claims, 2 Drawing Sheets

METHOD AND APPARATUS FOR THE IMAGE-WISE EXPOSURE OF LIGHT-SENSITIVE MEDIUM BY A PLURALITY OF LIGHT VALVES

FIELD OF THE INVENTION

The present invention relates to a method and apparatus for exposing a moving medium to an image using a plurality of light valves and, in particular, to forming the individual image dots by sequentially and synchronously actuating the light valves with the movement of the medium.

BACKGROUND OF THE INVENTION

Methods for the image-wise exposure of a moving light-sensitive medium by means of a light source and a plurality of switchable light valves disposed between the medium and the light source are well known. Generally, a light source and a number of switchable light valves disposed between the light source and the light-sensitive medium are connected to an actuating system controllable by image data. A synchronization device is connected to the actuating system for delivering a synchronization signal in accordance with the movement of the light-sensitive medium.

Illustrative of this type of device, is U.S. Pat. No. 4,375,648, in which image formation takes place by means of a two-dimensional array of light valves disposed at a small angle to the direction of advance of a light-sensitive layer and just above the latter. Each light valve is provided with a lens so that it is possible to image a relatively large light valve as a relatively small image dot. The small angular rotation of the array causes the image dots imaged on a reduced scale to be situated exactly next to one another as considered in the direction of movement of the light-sensitive layer.

A disadvantage of this type of device is that for the image-wise exposure of one line the image signals for each light valve in the array must have a specific delay time so that a complex control circuit is required. A two-dimensional lens array made and positioned with great accuracy is also required. Accordingly, it is an object of the invention is to obviate these and other disadvantages.

SUMMARY OF THE INVENTION

Generally, the present invention provides an improved method wherein each individual image dot on the light-sensitive medium is formed by sequentially and synchronously actuating with the movement of the light-sensitive medium a number of light valves which extend parallel to the direction of movement of the light-sensitive medium. The apparatus according to the present invention provides that in a column of n light valves disposed parallel to the direction of movement of the medium the actuating system sequentially feeds the data of each image dot to at least one light valve of the column in response to the synchronization signal.

As a result of the invention, it is possible to use very small light valves thereby obtaining a high resolution without a specific lens array being necessary. Furthermore, since each image dot receives sufficient light to create an image the speed of image formation can be greatly increased.

These and other advantages will be explained in the following description of the presently preferred embodiments taken in connection with the accompanying drawings.

PREFERRED EMBODIMENTS

Figure 1:
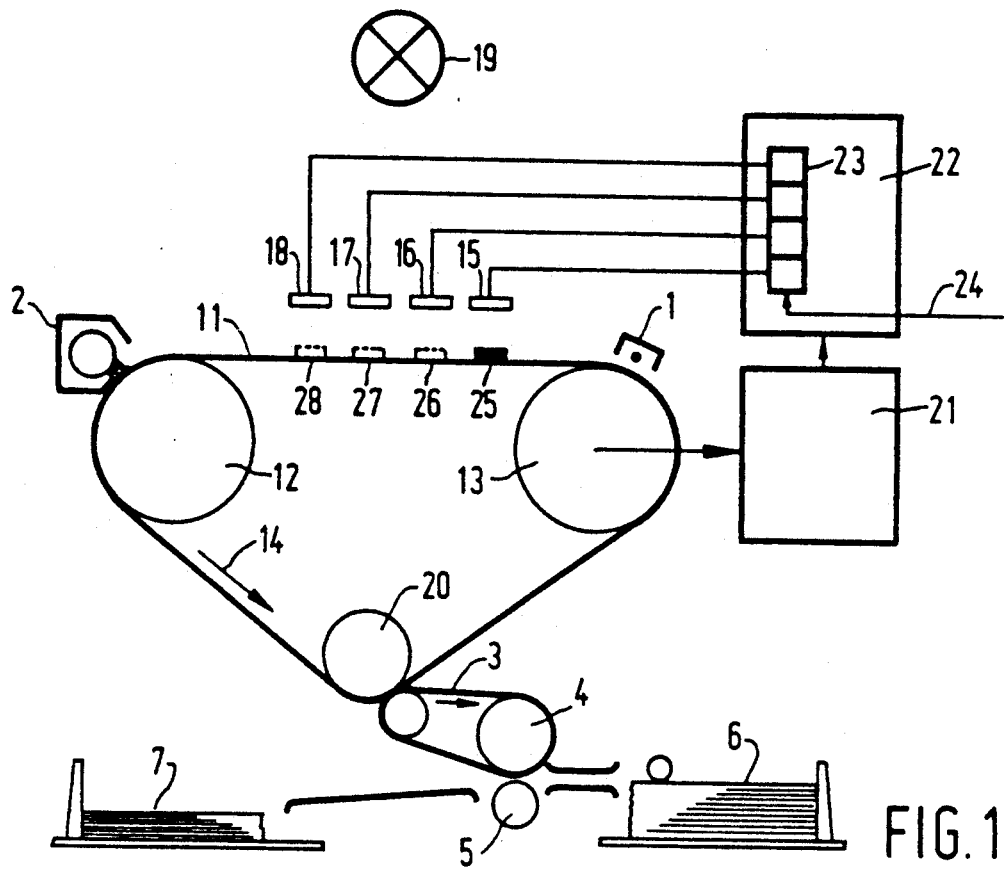
FIG. 1 is a diagram of a printer with an exposure system according to the invention.

FIG. 1 is a diagram of a printer in which an electrophotographic belt 11 is passed about three rollers 12, 13 and 20 in the direction of arrow 14. A belt of this kind provided, for example, with a zinc oxide layer or an organic light-sensitive layer, is charged in known manner by means of a charging unit 1, is then exposed image-wise and developed with toner powder by means of developing device 2. The resulting powder image is transferred in known manner to a heated silicone rubber belt 3. A sheet of receiving material is passed from a tray 6 between rollers 4 and 5, the powder image being transferred from the silicone rubber belt 3 to the receiving sheet on which it fuses. The resulting print is deposited in a receiving tray 7.

An array of electro-optical light valves 15 to 18 is disposed between a light source 19 and the electrophotographic belt 11 parallel to the belt and in the direction of movement 14 thereof. These light valves are preferably constructed from ferro-electric ceramic material, such as lanthanum, doped with lead-zirconate-titanate (PLZT), which is disposed between two crossed polarizers. Electrodes are provided on the ferro-electric ceramic material to apply an electric field over the various light valves required to be activated. The electric fields extend perpendicularly to the transmission direction of the light valves. When an electric field is applied in this way, the PLZT material becomes bi-refractive and the direction of the incident polarized light rotates according to the magnitude of the electric field. The result is that the transmission of light through the PLZT material and the polarizers is a function of the field strength.

In the conductive state, the light valves pass a relatively small quantity of light. The two polarizers limit the amount of transmitted light to a maximum of about 25%. In addition, the light is not perpendicular to the array and the PLZT has a light-scattering effect so that the light transmitted cannot contribute fully to the image formation. A Selfoc array (not shown) is disposed between the array and the light-sensitive medium. Only the light which enters the focusing light conductors at not too great an angle emerges again at the other side and can contribute to image formation. Consequently, each light valve is required to have the maximum possible brightness.

To obtain a high resolution of, for example, 20 image dots per mm, the size of each light valve must be small, e.g., 50×50 μm. Such small apertures are inadequate to pass a quantity of light to the light-sensitive medium so as to achieve fast image formation. According to the invention, this problem is solved in the manner to be described hereinafter.

Each light valve 15 to 18 (FIG. 1) is separately connected to an output of a serial-in parallel-out shift register 23 of actuating system 22. An image signal is fed via line 24 to shift register 23. A pulse disc is disposed on the shaft of roller 13 and delivers a signal in proportion to the movement of electrophotographic belt 11. This signal is fed to a synchronization device 21 in which a synchronization signal is generated, which is fed to the actuating system 22.

A first image signal is fed to shift register 23 via line 24. In response to a synchronization signal from the synchronization device 21, this image signal actuates the light valve 15 pulse-wise so that said valve passes a light pulse to the electrophotographic belt 11 so that an image dot 25 is formed on belt 11. If this image dot reaches position 26, a next synchronization signal is fed to the actuating system 22 by the synchronization device 21, so that the first image signal is transmitted to the next element of shift register 23 and the light valve 16 is thus actuated pulse-wise. As a result, image dot 25 again receives the same amount of light. This process is repeated once again for light valve 17 and for light valve 18, so that image dot 25 is exposed to light four times.

In this way it is possible to supply sufficient light to each image dot. The number of light valves actuated consecutively by the same image signal in the direction of movement of belt 11 determines the final printing speed of the printing machine.

When a first image signal is transmitted to a following element in the shift register a following image signal can simultaneously be fed to the shift register, If, for example, the first image signal is fed to light valve 17, the second image signal is simultaneously fed to light valve 16 and the third image signal to light valve 15.

Since the light valves frequently cannot abut one another as considered in the direction of movement of belt 11, but have to be disposed with intermediate spacing, shift register 23 should be constructed and connected accordingly. If the distance between two light valves is, for example, 100 μm while the size of one light valve is 50 μm, the output of the first element of the shift register is connected to a first light valve. The second light valve is then connected to the output of the fourth element of the shift register, the third light valve to the output of the seventh element, and so on. In this way the first light valve is actuated consecutively by the first, second and third image signal. On the supply of the fourth image signal to the shift register and hence also to the first light valve, the first image signal is transmitted to the fourth element of the shift register and thus actuates the second light valve. In this way image dots are depicted on electrophotographic belt 11 in contiguous relationship to one another.

The operation of the printer will be described with reference to FIG. 1, a number (n) of light valves being disposed one after the other (column-wise) as considered in the direction of movement of belt 11. To enable an image to be drawn line-wise a large number of columns of n light valves are disposed side by side over the width of electrophotographic belt 11. This n rows of light valves are disposed perpendicularly to the direction of movement of electrophotographic belt 11. A row having a length of, for example, 20 cm contains 4000 light valves.

Figure 2:
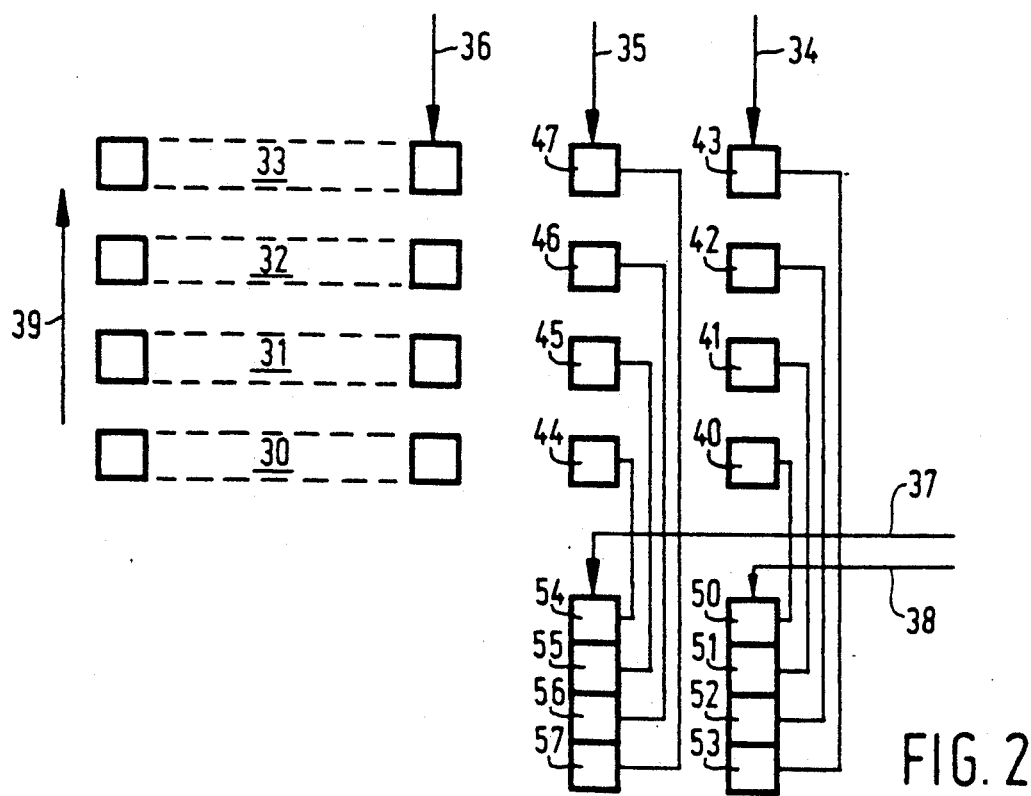
FIG. 2 diagrammatically represents a two-dimensional array of light valves with part of the actuating system.

FIG. 2 represents a number of light valves arranged in n rows 30 to 33 and in a number of columns 34, 35, 36, forming a two-dimensional array of light valves. The direction of movement of the electrophotographic belt is denoted by arrow 39.

All the light valves of a column are connected to a serial-in-parallel-out shift register. Thus in column 34 light valve 40 is connected to the output of element 50 of a shift register, light valve 41 to element 51, light valve 42 to element 52 and light valve 43 to element 53. The image signals from the image dots which, as considered in the direction of movement 39 of the electrophotographic belt, are required to be imaged successively on one line, are fed sequentially to the shift register via line 38. In the situation illustrated, each image dot is exposed four times on the electrophotographic belt.

The adjacent line is depicted by means of light valves 44 to 47 which, for this purpose, are connected to the outputs of a second shift register, elements 54 to 57 respectively. The image signals for this second line are fed via line 37.

All the columns are connected to a shift register in corresponding manner. The image signals from the image dots which, as considered perpendicularly to the direction of movement 39, are required to be situated on one line are all fed simultaneously to the various shift registers.

Figure 3:
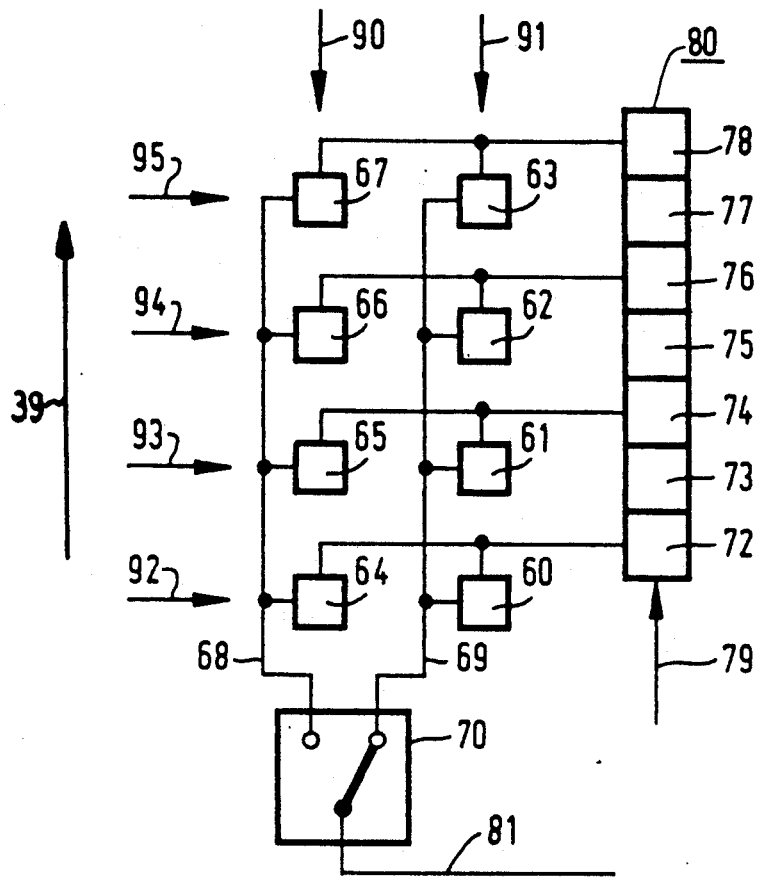
FIG. 3 diagrammatically represents another embodiment of a two-dimensional array of light valves with part of the actuating system.

FIG. 3 represents a number of light valves arranged in four rows 92, 93, 94, 95 and in two columns 90, 91, said elements forming a group of 2×4 light valves. This group is part of the two-dimensional array which extends further over the entire width of the electrophotographic belt in the direction of the rows 92 to 95. More generally, the entire array is divided up into a number of identical groups, each group being formed by n rows and m columns and hence n×m light valves. The n light valves of column 90 are interconnected via line 68 and the n light valves of column 91 are also interconnected via line 69. The lines 68 and 69 are connected to switch means 70. A pulsed voltage can be alternately connected to line 68 or line 69 via line 81. The m light valves in each row 92 to 95 are also interconnected and connected to the output of an element of serial-in parallel-out shift register 80.

Thus, element 78 is connected to light valves 63 and 67, element 76 to light valves 62 and 66, element 74 to light valves 61 and 65 and finally element 72 to light valves 60 and 64. The image signals from two rows of image dots which, as considered in the direction of movement 39 of the electrophotographic belt, are required to be imaged on two adjacent lines, are fed via line 79. The image signals are fed by means of a synchronization signal originating from the electrophotographic belt.

This circuit operates as follows. In response to a synchronization signal a first image signal is fed via line 79 to element 72 of shift register 80. Switch means 70 connects line 69 to a pulsed voltage and light valve 60 is actuated. On a following synchronization signal a second image signal associated with the left-hand column 90 is then fed to element 72 while the first image signal is passed on to element 73. Switch means 70 now connects line 68 to a pulsed voltage and light valve 64 is actuated.

A third image signal is fed via line 79 to element 72 on a subsequent synchronization signal while the first image signal is passed on to element 74 and the second image signal to element 73. Switch means 70 now again connects line 69 to a pulsed voltage, so that the third image signal actuates light valve 60 and the first image signal actuates light valve 61. As already explained, the synchronization signals are such that actuation of the light valve 61 by the first image signal takes place precisely if the first image dot can be exposed by light valve 61.

The subsequent image signals can be fed to shift register 80 in corresponding manner. The result is that the first image signal sequentially actuates the light valves in column 91 and each image dot is obtained by four consecutive exposures.

This method of control using the multiplex method described enables the light valve array to be made more simply. As a result the number of connecting lines decreases and the light valve density can increase. The speed of the electrophotographic belt, however, must decrease because the exposure time available for each light valve is inversely proportional to the number of columns m per group. Hence, it is necessary always to make m smaller than n.

The number of connection points of the two-dimensional array can be greatly reduced by disposing the shift registers on the array substrate. Thus, for example, in column 34 (FIG. 2) element 51 can be disposed between light valves 40 and 41, element 52 between light valves 41 en 42, and element 53 between light valves 42 and 43, so that in this column 34 only one connection point has to be made for an external circuit.

The rows of light valves described can also be used to reproduce image dots with a specific gray tint. If, for example, each column contains eight light valves, then just some of these light valves in the column can be actuated dependent upon the required gray value. If one light valve in the column is actuated, then an image dot receives one-eighth of the amount of light required for complete exposure of an image dot. Consequently a dark gray tint forms on development. If, for example, seven light valves are actuated in a column, a light gray image dot forms on development. Actuation of the light valves in a column need not take place at consecutive light valves. If, for example, three light valves are required to be actuated to give a specific gray tint, it is possible to use the first three light valves in the column or the least three or in any other arbitrary sequence, e.g., light valves 2, 6 and 7.

In order to reproduce gray tints, the actuating system is preferably constructed as follows. In the case of eight gray tints, each image signal is preferably reproduced with a 3-bit code. If, for example, a 3-bit wide shift register is used, the light valve will be actuated only if the contents of a 3-bit element is more then "0". On passage to the next 3-bit element "1" is deducted from the code of the original image signal, and so on. The skilled addressee will know of many other methods to embody such actuation for gray tints.

Figure 4:
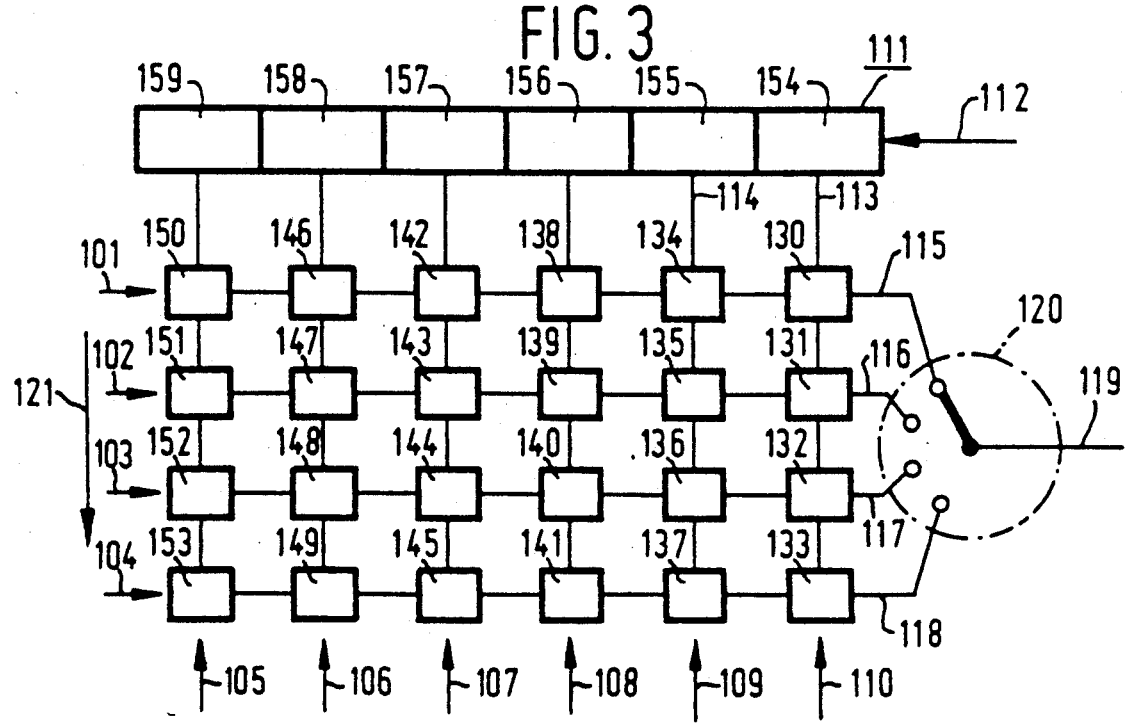
FIG. 4 diagrammatically represents still another embodiment of a two-dimensional array of light valves with part of the actuating system.

FIG. 4 represents yet another embodiment of a two-dimensional array of light valves with part of the actuating system. A two-dimensional array of ferro-electric liquid crystals is used in this embodiment. These are preferably bi-stable light valves which can be opened, for example, by means of a positive voltage pulse. In the absence of this pulse the light valves remain in the light-passing condition. To close them a negative voltage pulse is fed to the light valves. Light valves of this kind are described, for example, in U.S. Pat. No. 4,712,872.

The ferro-electric liquid crystal light valves 130 to 153 (FIG. 4) are arranged in four rows, 101 to 104, which extend perpendicularly to the direction of movement of arrow 121 of the light-sensitive medium. All the light valves in a row are interconnected, row 101 to line 115, row 102 to line 116, row 103 to line 117 and row 104 to line 118. The light valves are also connected column-wise to the outputs of a serial-in parallel-out shift register 111. Column 110 is connected via line 113 to element 154 of shift register 111 and column 109 is connected via line 114 to element 155, and so on. The number of light valves in a row is 6000 in the case of 20 light valves per mm and with a total width of the light-sensitive element of about 30 cm. The number of light valves in a column is again dependent upon the required image forming speed and the amount of light which reaches the light-sensitive medium through each light valve.

Via line 112 image signals of an entire image line for imaging are fed serially to elements 154 to 159 of shift register 111. By means of switch 120 a pulsed signal is fed via line 119 and line 115 to row 101, so that the light valves in row 101 are opened image-wise in accordance with the image signals of the first image line. After exposure to light, a "close pulse" is fed to row 101 via line 119 and the light-sensitive medium is shifted until the first image line has arrived under row 102. Switch 120 connects an "open pulse" to line 116 and the first image line is exposed to light image-wise for the second time. The image signals from a second image line are then fed to the shift register 111 and an "open pulse" is fed via switch 120 to row 101 via line 115. Switch 120 then feeds a "close pulse" to row 102 and then to row 101, and the first image line on the light-sensitive medium is passed on to the third row 103. The image signals of the first image line are then again fed to shift register 111 and an "open pulse" is fed to row 103 via line 117 so that the first image line is exposed to light for the third time. The image signals of the second image line are fed to shift register 111 and row 102 is opened. The image signals of a third image line are then fed to shift register 111 and row 101 is opened. The light valves in the rows 103, 102 and 101 are then again successively closed by means of a "close pulse" and the first image line is shifted to the fourth row 104. The cycle described is again repeated and the image signals of a fourth image line are then added.

If the first image line is situated under fourth row 104, the sequence of each cycle can always be made the same. Consecutive image signals of four consecutive image lines are always fed serially to shift register 111 and switch 120 is switched accordingly so that the correct row is actuated with an "open pulse". The successive rows can then be closed in the same way by means of "close pulse" via switch 120. By interconnecting rows 101 to 104 it is also possible to simultaneously close all the light valves by just one "close pulse".

The invention is not limited to the embodiments described. The skilled addressee will be able to think of many variants thereof. Instead of the light valves described it is possible to use a number of equivalent elements. One example of this is light valves based on liquid crystals (LCD's). The actuating system can also be embodied in various ways. The shift registers can be replaced by a memory in which the image data of a whole page to be printed are stored, the memory being directly addressable to enable the correct image data to be fed to a specific light valve. Numerous circuits are also known for controlling a number of elements in a group by the multiplex method. All these variants, however, will come under the following claims.

What is claimed is:

1. A method for image-wide exposing an image onto a moving light-sensitive medium comprising the steps of:

forming a plurality of image dots on said medium with a plurality of switchable light valves positioned between the medium and a light source; and forming each individual dot by sequentially actuating said light valves in a direction of movement of said light-sensitive medium and in synchronism with said movement.

2. A method according to claim 1, wherein a number of light valves to be actuated for each image dot to be reproduced is related to a required gray value of said image dot.

3. Apparatus for image-wise exposing an image onto a moving light-sensitive medium comprising a light source; a plurality of switchable light valves disposed between said light source and said light-sensitive medium, and arranged in columns parallel to a direction of movement of said medium; an actuating means connected to said light valves of controllably actuating said light valves according to received image data; and a means for synchronization connected to said actuating means for delivering a synchronization signal in accordance with the movement of the light-sensitive medium and, in response to said synchronization signal, sequentially feeding image data to said actuating means to sequentially actuate the light valves in each of said columns to form each of a plurality of individual image dots.

4. Apparatus according to claim 3, wherein said actuating means comprises a shift register for each column, with a whole multiple of n elements to which said image data can be supplied serially, each of said light valves being connected to the output of one element.

5. Apparatus according to claim 3, wherein said actuating means is provided with a circuit by which a number of light valves in one column are actuated dependent upon a required gray value of each of said individual image dots.

6. Apparatus according to claim 3, wherein said light valves are disposed in the form of n parallel rows extending perpendicularly to the direction of movement of the light-sensitive medium and wherein m light valves are always interconnected to each row, where $m < n$ and wherein groups of n x m light valves are actuated by multiplexing.

7. Apparatus according to claim 3, 4, 5 or 6. wherein at least part of said actuating means is integrated with said light valves on one substrate.

* * * * *

UNITED STATES PATENT AND TRADEMARK OFFICE
CERTIFICATE OF CORRECTION

PATENT NO. : 5,043,743
DATED : August 27, 1991
INVENTOR(S) : Antonius H.M. Habets, et. al.

It is certified that error appears in the above-indentified patent and that said Letters Patent is hereby corrected as shown below:

Title page, item [54] and col. 1, line 1-4, replace title with -- METHOD AND APPARATUS FOR IMAGE-WISE EXPOSURE OF A LIGHT-SENSITIVE MEDIUM WITH IMAGE DOTS FORMED BY EXPOSURE THROUGH A PLURALITY OF LIGHT VALVES --.

In Claim 1, column 7, line 1, the word "image-wide" should be --image-wise--.

In Claim 3, column 7, line 21, the word "of" should be --for--.

In Claim 3, column 8, line 2, after the word "actuate" please insert --at least one of--.

Signed and Sealed this

Ninth Day of May, 1995

Attest:

BRUCE LEHMAN

*Attesting Officer*       *Commissioner of Patents and Trademarks*